United States Patent
Xia

(10) Patent No.: US 11,611,481 B2
(45) Date of Patent: *Mar. 21, 2023

(54) POLICY MANAGEMENT METHOD AND SYSTEM, AND APPARATUS

(71) Applicant: HUAWEI TECHNOLOGIES CO., LTD., Guangdong (CN)

(72) Inventor: Haitao Xia, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 202 days.

This patent is subject to a terminal disclaimer.

(21) Appl. No.: 16/950,322

(22) Filed: Nov. 17, 2020

(65) Prior Publication Data

US 2021/0075683 A1 Mar. 11, 2021

Related U.S. Application Data

(63) Continuation of application No. 16/521,373, filed on Jul. 24, 2019, now Pat. No. 10,855,543, which is a continuation of application No. PCT/CN2018/073449, filed on Jan. 19, 2018.

(30) Foreign Application Priority Data

Jan. 25, 2017 (CN) .......................... 201710061358.9

(51) Int. Cl.
*H04L 41/0893* (2022.01)
*H04L 41/5041* (2022.01)
(Continued)

(52) U.S. Cl.
CPC ...... *H04L 41/0893* (2013.01); *H04L 41/5041* (2013.01); *G06F 9/485* (2013.01); *G06F 2009/45566* (2013.01)

(58) Field of Classification Search
CPC . H04L 41/0893; H04L 41/5041; H04L 6/485; G06F 6/485; G06F 2009/455
See application file for complete search history.

(56) References Cited

U.S. PATENT DOCUMENTS 5,740,248 A 4/1998 Fieres et al.
9,667,509 B1 * 5/2017 Levi ...................... H04L 43/091
(Continued)

FOREIGN PATENT DOCUMENTS

CN 104618396 A 5/2015
CN 104811328 A 7/2015
(Continued)

OTHER PUBLICATIONS

3GPP TR 32.842 V1 2.0 (Jun. 2015),3rd Generation Partnership Project;Technical Specification Group Services and System Aspects;Telecommunication management;Study on network management of virtualized networks (Release 13),total 67 page.
(Continued)

*Primary Examiner* — Azizul Choudhury
(74) *Attorney, Agent, or Firm* — Womble Bond Dickinson (US) LLP

(57) ABSTRACT

This application relates to the field of communications technologies, and in particular, to a policy management method and system, and an apparatus. The method includes: requesting, by a policy decision entity, an NFVO in a management domain of a composite NS to perform a management operation on a policy group. According to the solution provided in this application, consistency between the LCM policy of the composite NS and the LCM policy of the nested NS forming the composite NS is ensured, and policy management execution efficiency is improved in a scenario of providing a composite NS across management domains.

20 Claims, 6 Drawing Sheets

(51) Int. Cl.
*G06F 9/48* (2006.01)
*G06F 9/455* (2018.01)

(56) References Cited

U.S. PATENT DOCUMENTS

| | | | |
|---|---|---|---|
| 9,806,979 B1* | 10/2017 | Felstaine | ................. H04L 43/10 |
| 2011/0031275 A1 | 2/2011 | Lucey et al. | |
| 2015/0052095 A1 | 2/2015 | Yang et al. | |
| 2015/0180730 A1* | 6/2015 | Felstaine | ............ H04W 12/084 |
| | | | 709/225 |
| 2016/0205004 A1 | 7/2016 | Chou et al. | |

FOREIGN PATENT DOCUMENTS

| | | |
|---|---|---|
| CN | 105656646 A | 6/2016 |
| CN | 105847237 A | 8/2016 |
| CN | 106161049 A | 11/2016 |
| CN | 106302068 A | 1/2017 |
| WO | 2015110083 A1 | 7/2015 |
| WO | 2015197025 A1 | 12/2015 |
| WO | 2016206403 A1 | 12/2016 |

OTHER PUBLICATIONS

XP014235740 ETSI GS NFV-MAN 001 V1.1 1 (Dec. 2014),Network Functions Virtualisation (NFV);Management and Orchestration,total 184 pages.

XP044242643 FG-IMT2020,"Draft Technical Report: Report on application of network softwarization to IMT-2020", Geneva, Dec. 5-9, 2016,total 146 pages.

XP050986292 3GPP TR 32.842 V1.2.0 (Jun. 2015),3rd Generation Partnership Project;Technical Specification Group Services and System Aspects;Telecommunication management;Study on network management of virtualized networks (Release 13),total 68 page.

* cited by examiner

POLICY MANAGEMENT METHOD AND SYSTEM, AND APPARATUS

CROSS-REFERENCE TO RELATED APPLICATIONS

This application is a continuation of U.S. patent application Ser. No. 16/521,373, filed on Jul. 24, 2019, which is a continuation of International Application No. PCT/CN2018/073449, filed on Jan. 19, 2018. The International Application claims priority to Chinese Patent Application No. 201710061358.9, filed on Jan. 25, 2017. All of the aforementioned patent applications are hereby incorporated by reference in their entireties.

TECHNICAL FIELD

This application relates to the field of communications technologies, and in particular, to a policy management method and system, and an apparatus applicable to an NFV field.

BACKGROUND

In network function virtualization (NFV, Network Function Virtualization), a telecommunications network operator uses a virtualization technology in the information technology (IT, Information Technology) field to decouple software and hardware for implementation of some telecommunications network functions in a general-purpose cloud server, switch, and memory, to implement rapid and efficient deployment of a network service (NS, Network Service), and achieve an operation target of reducing a capital expenditure (CAPEX, Capital expenditure) and an operating expense (OPEX, operating expense). In this technology, the telecommunications network function needs to be implemented in a software manner, can run on hardware of a general-purpose server, and can be migrated, instantiated, and deployed at different physical locations of a network as required, and no new device needs to be installed.

A scenario of providing an NS across management domains exists in deployment of a network service (Network Service, NS). This scenario may occur when a large service provider provides a global NS through cooperation of each branch, or a lease service of the NS is provided between different service providers by using a network sharing protocol. The global NS is referred to as a composite NS, the composite NS includes a plurality of nested NSs, and each nested NS is provided in a management domain different from that of the composite NS. In the scenario of providing a composite NS across management domains, policies of different levels or different policies of a same level may conflict with each other due to diversity of functional entities that generate or create the policies. Currently, an NFV MANO policy management technology is capable of performing only a management operation on a single policy. A policy of a composite NS and a policy of a nested NS are separately performed, and this cannot meet a policy management requirement in the scenario of providing a composite NS across management domains. Therefore, a new policy management method needs to be proposed.

SUMMARY

Embodiments of the present invention provide a policy management method and system, and an apparatus, to resolve a problem that an LCM (Life Cycle Management, life cycle management) policy of a composite NS is inconsistent with or conflicts with an LCM policy of a nested NS forming the composite NS in a scenario of providing a composite NS (network service, Network Service) across management domains, to ensure that the composite NS provides a network service as a whole, or performs a life cycle management operation of a network service as a whole. In the embodiments of the present invention, the composite NS includes one or more nested NSs, and the composite NS and the nested NS forming the composite NS are provided in different management domains. An NFVO in a management domain of the composite NS is responsible for life cycle management of the composite NS, and an NFVO in a management domain of the nested NS is responsible for life cycle management of the nested NS.

According to a first aspect, an embodiment of the present invention provides a method for managing an LCM policy of a composite NS and an LCM policy of a nested NS in a scenario of providing the composite NS across management domains. The method includes: managing, on a per-group basis, the LCM policy of the composite NS and the LCM policy of the nested NS forming the composite NS. A policy decision entity requests an NFVO in a management domain of the composite NS to perform a policy management operation on a policy group. The NFVO in the management domain of the composite NS undertakes a function of a policy execution entity in the management domain of the composite NS, and performs a policy management operation on the LCM policy of the composite NS based on a policy management request of the policy decision entity. In addition, as a proxy of the policy decision entity, the NFVO in the management domain of the composite NS initiates, to the NFVO in the management domain of the nested NS forming the composite NS, a policy management operation on the LCM policy of the nested NS in the policy group based on a received policy operation request of the policy decision entity. In the solution provided in this embodiment of the present invention, the policy management operation on the LCM policy of the composite NS and the policy management operation on the LCM policy of the nested NS forming the composite NS come from the same policy decision entity. This avoids inconsistency between the LCM policy of the composite NS and the LCM policy of the nested NS forming the composite NS due to diversity of policy sources, thereby ensuring that the composite NS provides the network service as a whole. In addition, because the NFVO in the management domain of the composite NS acts as the proxy of the policy decision entity, the policy decision entity does not need to directly deliver a policy management operation to an NFVO in a management domain of each nested NS. The NFVO in the management domain of the composite NS shares a workload of the policy decision entity, and this improves policy management execution efficiency in the scenario of providing the composite NS across management domains. It should be noted that, in this embodiment of the present invention, a type of policy management operation requested by the NFVO in the management domain of the composite NS from the NFVO in the management domain of the nested NS is the same as a type of policy management operation requested by the policy decision entity from the NFVO in the management domain of the composite NS.

In a possible design, when the policy decision entity needs to perform a policy management operation on the LCM policy of the composite NS and the LCM policy of the nested NS forming the composite NS, the policy decision entity sends a policy management operation request to the NFVO in the management domain of the composite NS, where the policy management operation request includes an identifier of the policy group, and the policy group includes an identifier of the LCM policy of the composite NS and an identifier of the LCM policy of the nested NS forming the composite NS. After receiving the policy management operation request sent by the policy decision entity, the NFVO in the management domain of the composite NS performs a policy management operation on the LCM policy of the composite NS in the policy group, and in addition, determines, based on the identifier of the policy group, the identifier of the LCM policy that is of the nested NS and that is included in the policy group, and sends the policy management operation request to the NFVO in the management domain of the nested NS, where the request message includes the identifier of the LCM policy of the nested NS. It can be learned that the policy management operation request message of the policy decision entity is used to perform the policy management operation on both the LCM policy of the composite NS and the LCM policy of the nested NS in the policy group. A source of the policy management operation is unique, and consistency between policies is ensured. The NFVO in the management domain of the composite NS acts as the proxy of the policy decision entity, and shares load of the policy decision entity. Optionally, the policy management operation request message sent by the policy decision entity may further include the identifier of the LCM policy of the composite NS. The NFVO in the management domain of the composite NS may directly learn of, from the received message, the identifier of the LCM policy of the to-be-operated composite NS, thereby further simplifying processing of the NFVO in the management domain of the composite NS.

In a possible design, when the policy management operation request received by the NFVO in the management domain of the composite NS includes the identifier of the policy group, the NFVO in the management domain of the composite NS may use the identifier of the policy group as an indication that the policy decision entity requires to perform a policy management operation on a member policy in the policy group, to initiate a policy management operation on the LCM policy of the nested NS in the policy group. Alternatively, it may be determined, based on a local policy, whether to perform the policy management operation on the LCM policy of the nested NS in the policy group.

The policy group in this embodiment of the present invention is a set including an LCM policy of a composite NS and LCM policies of one or more nested NSs forming the composite NS. The policy group includes an identifier of the LCM policy of the composite NS and an identifier of the LCM policy of the nested NS. In a possible design, the policy decision entity may request the NFVO in the management domain of the composite NS to create the policy group, which specifically includes the following: The policy decision entity requests the NFVO in the management domain of the composite NS to create the policy group, where the request message includes an identifier of a member policy forming the policy group, and the member policy includes an LCM policy of one composite NS and LCM policies of one or more nested NSs forming the composite NS; the NFVO in the management domain of the composite NS creates the policy group based on a policy group creation request message, allocates an identifier to the policy group, and sends a response message to the policy decision entity, where the response message includes the identifier of the policy group; and the policy decision entity obtains and records, in the received response message that is for the policy group creation request and that is sent by the NFVO in the management domain of the composite NS, the identifier allocated by the NFVO in the management domain of the composite NS to the policy group. Therefore, both the policy decision entity and the NFVO in the management domain of the composite NS create a record of the policy group, where the record includes the identifier of the policy group and the identifier of the member policy in the policy group. Subsequently, the policy decision entity needs to include only the identifier of the policy group in the policy management operation request sent to the NFVO in the management domain of the composite NS. The NFVO in the management domain of the composite NS not only performs a policy management operation on the LCM policy in the management domain of the composite NS, but also replaces the policy decision entity to initiate a policy management operation on the LCM policy of the nested NS in the policy group.

In a possible design, when the policy decision entity does not need to maintain the policy group, for example, when a life cycle of the composite NS ends, the policy decision entity may send a policy group deletion request message to the NFVO in the management domain of the composite NS, so that the NFVO in the management domain of the composite NS deletes a locally recorded policy group.

In a possible design, the policy management operation performed on the policy group may include operations such as policy update, policy deletion, policy activation, or policy deactivation. Performing a policy activation or deactivation operation on the policy group may ensure that the LCM policy of the composite NS and the LCM policy of the nested NS in the policy group are enabled or disabled simultaneously. During a policy update operation on the policy group, a policy update parameter delivered by the policy decision entity is applied to the member policy in the policy group. This can ensure consistency between the LCM policy of the composite NS and the LCM policy of the nested NS, including consistency between trigger conditions and consistency between trigger actions in the policies. During a policy deletion operation, the policy decision entity may simultaneously delete the member policy in the policy group.

According to a second aspect, an embodiment of the present invention provides a policy decision entity, where the policy decision entity has a function of implementing behavior of the policy decision entity in the method according to the first aspect. The function may be implemented by hardware, or may be implemented by hardware by executing corresponding software. The hardware or the software includes one or more modules corresponding to the foregoing function.

In a possible design, the policy decision entity includes a communications interface, a memory, and a processor. The communications interface is configured to send a request message to an NFVO in a management domain of a composite NS or receive a response message from the NFVO in the management domain of the composite NS; the memory is configured to store a computer executable instruction, an identifier of a policy group, and an identifier of a member policy included in the policy group; and the processor is connected to the memory and the communications interface by using a bus, and is configured to execute the computer executable instruction in the memory to implement the function of the policy decision entity in the method according to the first aspect.

In a possible design, the policy decision entity includes a communication module and a processing module. The communication module is configured to send a request message to an NFVO in a management domain of a composite NS or receive a response message from the NFVO in the management domain of the composite NS; and the processing module is configured to: generate a policy management operation request message, and send the policy management operation request message by using the communication module, where the policy management operation request message includes an identifier of a policy group.

In a possible implementation, the processing module of the policy decision entity is further configured to: generate a policy group creation or deletion request message, and send the request message by using the communication module, where the policy group creation request message includes an identifier of a member policy in the policy group, and the member policy includes an LCM policy of one composite NS and LCM policies of one or more nested NSs forming the composite NS; and is further configured to: parse the response message that is received by the communication module from the NFVO in the management domain of the composite NS, and record the identifier of the policy group included in the response message.

According to a third aspect, an embodiment of the present invention provides an NFVO in a management domain of a composite NS. The NFVO in the management domain of the composite NS has a function of implementing behavior of the NFVO in the management domain of the composite NS in the method according to the first aspect. The function may be implemented by hardware, or may be implemented by hardware by executing corresponding software. The hardware or the software includes one or more modules corresponding to the foregoing function.

In a possible design, the NFVO in the management domain of the composite NS includes a communications interface, a memory, and a processor. The communications interface is configured to communicate with a policy decision entity or an NFVO in a management domain of a nested NS; the memory is configured to store a computer executable instruction, an identifier of a policy group, and an identifier of a member policy included in the policy group; and the processor is connected to the memory and the communications interface by using a bus, and is configured to execute the computer executable instruction in the memory to implement the function of the NFVO in the management domain of the composite NS in the method according to the first aspect.

In a possible design, the NFVO in the management domain of the composite NS includes a communication module and a processing module. The communication module is configured to: receive a policy management operation request message sent by a policy decision entity, and send the policy management operation request message to an NFVO in a management domain of a nested NS; and the processing module is configured to: parse the received policy management operation request message, determine, based on an identifier of a policy group included in the policy management operation request message, an identifier of an LCM policy that is of a nested NS and that is included in the policy group, and generate a policy management operation request sent to the NFVO in the management domain of the nested NS, where the request message includes the identifier of the LCM policy of the nested NS.

In a possible implementation, the communication module of the NFVO in the management domain of the composite NS is further configured to receive a policy group creation or deletion request message from the policy decision entity, and is further configured to send a policy group creation or deletion response message to the policy decision entity; the processing module of the NFVO in the management domain of the composite NS is further configured to: parse the received policy group creation request message, create a policy group locally, and allocate an identifier to the policy group, where the policy group creation request message includes an identifier of a member policy in the policy group, and the member policy includes an LCM policy of one composite NS and LCM policies of one or more nested NSs forming the composite NS, and generate the response message for the policy group creation request, and send the response message to the policy decision entity by using the communication module, where the response message for the policy group creation request includes the identifier of the policy group; and the processing module is further configured to parse the policy group deletion request message received by the communication module, and deletes a corresponding policy group according to an identifier of the policy group in the request message.

According to a fourth aspect, an embodiment of the present invention provides a policy management system, including the policy decision entity in the method according to the first aspect or the apparatus according to the second aspect, and the NFVO in the management domain of the composite NS in the method according to the first aspect or the apparatus according to the third aspect.

According to a fifth aspect, an embodiment of the present invention provides a readable storage medium, configured to store a computer software instruction used by the foregoing policy decision entity or the NFVO in the management domain of the composite NS, and when the computer software instruction runs on a computer, the computer performs the method related to the policy decision entity or the NFVO in the management domain of the composite NS in the method according to the first aspect.

According to a sixth aspect, an embodiment of the present invention provides a computer program product including an instruction. When the computer program product runs on a computer, the computer performs the methods according to the foregoing aspects.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following describes the technical solutions in the embodiments of the present invention with reference to the accompanying drawings in the embodiments of the present invention. Network architectures and service scenarios described in the embodiments of the present invention are to describe the technical solutions in the embodiments of the present invention more clearly, but are not intended to limit the technical solutions provided in the embodiments of the present invention. A person of ordinary skill in the art may understand that, with evolution of the network architecture and appearance of a new service scenario, the technical solutions provided in the embodiments of the present invention may also be applicable to a similar technical solution.

Figure 1:
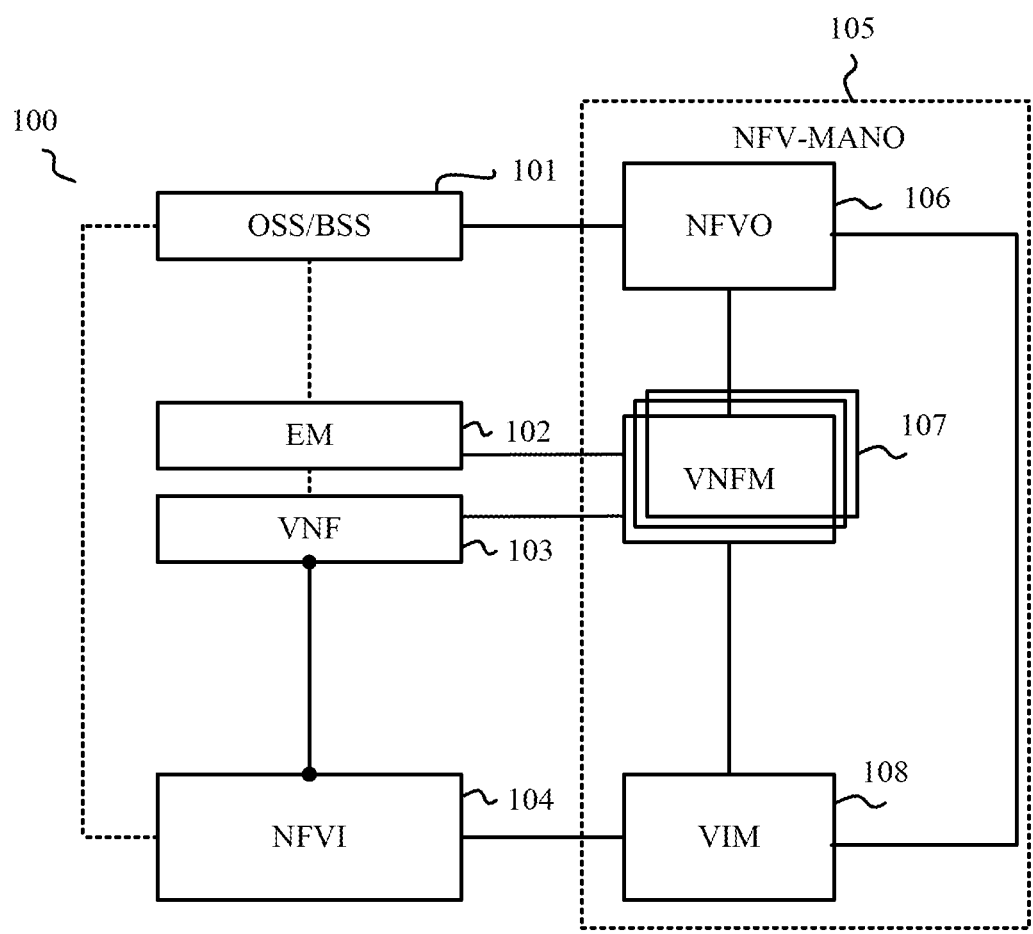
FIG. 1 is a schematic architectural diagram of a possible NFV system according to an embodiment of the present invention.

As shown in FIG. 1, a possible NFV system (100) includes an OSS/BSS (Operation Support System/Business Support System, operation support system/business support system) (101), an EMS (Element Management System, element management system) (102), a VNF (Virtualized Network Function, virtualized network function) (103), an NFVI (Network Function Virtualization Infrastructure, network function virtualization infrastructure) (104), and an NFV MANO (NFV Management and Orchestration, NFV management and orchestration) (105). The NFV MANO includes a plurality of management function entities: an NFVO (NFV Orchestrator, network function virtualization orchestrator) (106), a VNFM (Virtualized Network Function Manager, virtualized network function manager) (107), and a VIM (Virtualized Infrastructure Manager, virtualized infrastructure manager) (108).

The OSS/BSS (101) mainly provides a telecommunications service operator with an integrated network management and service operation function, including network management (for example, fault monitoring and network information collection), accounting management, policy management, customer service management, and the like. In this embodiment of the present invention, the OSS/BSS undertakes a function of a policy decision entity.

The NFVO (106) implements network service life cycle management (NS LCM, Network Service Life cycle Management), and cooperates with the VNFM to implement functions such as life cycle management of the VNF.

The VNFM (107) implements life cycle management of a virtualized network function VNF, including management and processing of a VNFD, initialization of a VNF instance, scaling out/in of the VNF, and termination of the VNF instance, and can receive a flexible scaling (scaling) policy delivered by the NFVO to implement flexible scaling of the VNF.

The VIM (108) is mainly responsible for management, monitoring, and fault reporting of a hardware resource and a virtualized resource at an infrastructure layer, and providing a virtualized resource pool for an upper-layer application.

Figure 2:
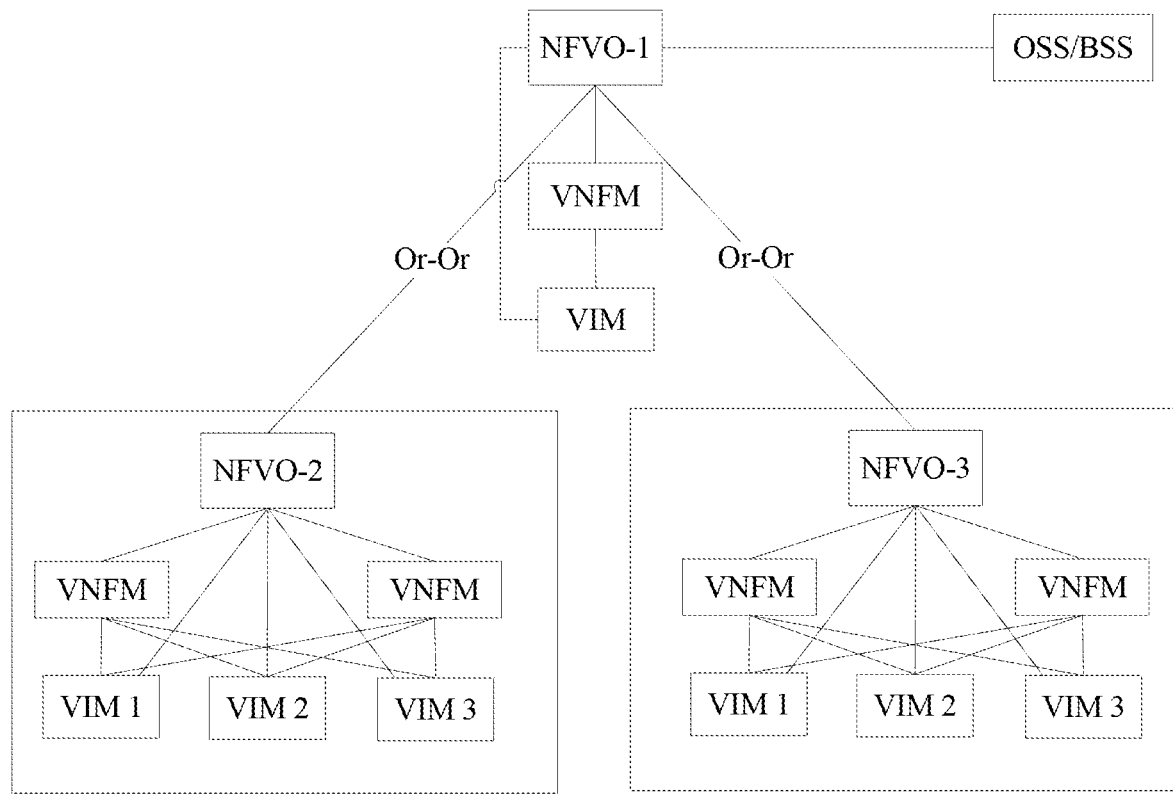
FIG. 2 is a schematic architectural diagram of a possible composite NS according to an embodiment of the present invention.

FIG. 2 shows a possible architecture of a composite NS provided across management domains, including a plurality of management domains. Each management domain includes a set of NFV MANO management function entities shown in FIG. 1. The NFVO is responsible for providing a network service and life cycle management of the network service in the management domain. A management domain in which an NFVO-2 is located provides an NS-A, a management domain in which an NFVO-3 is located provides an NS-B, and a management domain in which an NFVO-1 is located provides a composite NS in cooperation with the management domains in which the NFVO-2 and the NFVO-3 are located. In other words, the NS-A and the NS-B are components of the composite NS, and the NS-A and the NS-B are referred to as nested NSs. The NFVO-1, the NFVO-2, and the NFVO-3 form an umbrella-shaped management architecture. The NFVO-1 is responsible for life cycle management of the composite NS, the NFVO-2 and the NFVO-3 are responsible for life cycle management of their respective nested NSs, and the NFVO-1 communicates with the NFVO-2/the NFVO-3 through an Or-Or interface. For example, a network of a telecommunications operator with a relatively large scale has two layers of structures: one head office network and a plurality of subsidiary office networks. Each subsidiary office network has a management domain configured with an NFVO. An NFVO in the head office network is equivalent to the NFVO-1 in FIG. 2, and an NFVO in each subsidiary office network is equivalent to the NFVO-2 or the NFVO-3 in FIG. 2. When the telecommunications operator needs to provide a service for the head office network, for example, a VoLTE (Voice over LTE, voice over LTE) network service, the head office network may be designated to provide a user management and policy control network service forming the VoLTE, a subsidiary office network A provides an EPC (Evolved Packet Core, evolved packet core) network service forming the VoLTE, and a subsidiary office network B provides an IMS core network network service forming the VoLTE. Certainly, when the VoLTE network service is actually deployed, another network service in addition to the EPC network service and the IMS core network network service may further be required, or there may be another network service combination. Details are not described herein.

The policy decision entity in this application may be an OSS/BSS when being mapped to FIG. 2, or may be an independent policy manager. In the following embodiments of this application, the OSS is used as an example to describe how the policy decision entity performs cooperative policy management across management domains. The method is also applicable to a scenario in which the independent policy manager is used as the policy decision entity.

A composite NS architecture shown in FIG. 2 is used as an example. Management domains in which the composite NS, a nested NS-A, and a nested NS-B are located are configured with life cycle management policies of respective NSs. In this embodiment of the present invention, for example, an NS cure policy is used as a management policy, and it is assumed that NS cure policies of the management domains are respectively as follows:

A cure policy 1 of the composite NS: When receiving a virtual resource fault alarm of a severe fault level, the NFVO-1 migrates a member VNF instance (which does not include a member nested NS instance) of the composite NS instance to another available standby virtual machine.

A cure policy 2 of the nested NS-A: When receiving a virtual resource fault alarm of a severe fault level, the NFVO-2 migrates a member VNF instance of the nested NS instance to another available container.

A cure policy 3 of the nested NS-B: When detecting that a quantity of bytes sent/received by a virtual link per second is less than a preset threshold, the NFVO-3 migrates a member VNF instance of the nested NS instance to another available standby virtual machine.

It may be learned that because the composite NS and the nested NSs belong to different management domains, there is no unified policy design and planning between the management domains. To ensure policy consistency between the composite NS and the nested NSs, an LCM policy of the composite NS and LCM policies of the nested NSs need to be managed in a unified manner. A policy management method is proposed in this embodiment of the present invention. The LCM policy of the composite NS and the LCM policies of the nested NSs forming the composite NS are managed in a unified and cooperative manner as a policy group. The NFVO-1 in the management domain of the composite NS needs to perform an operation on the LCM policy of the composite NS in the management domain, and in addition, needs to trigger the NFVO-2 in the management domain of the nested NS forming the composite NS to cooperate to perform an operation on the LCM policy of the nested NS, to ensure consistency between the LCM policy of the composite NS and the LCM policy of the nested NS forming the composite NS. Under the unified and cooperative management, a policy conflict caused by separately setting and managing policies in the management domains is avoided, system maintenance efficiency is improved, and system running reliability and stability are ensured. The following further describes the technical solutions of the present invention by using the composite NS architecture shown in FIG. 2 and the NS cure policies of the foregoing management domains as an example.

Figure 3:
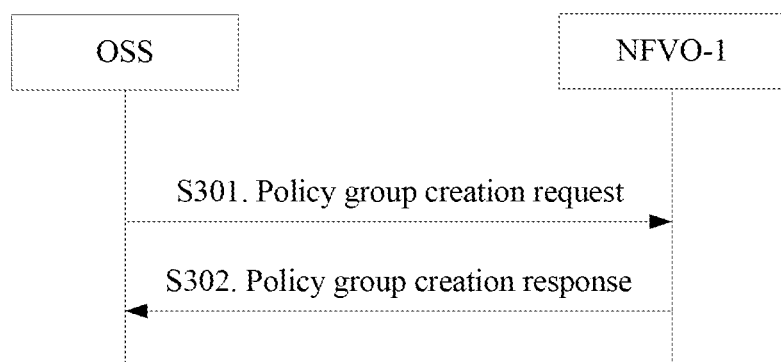
FIG. 3 is a schematic flowchart of creating a policy group according to an embodiment of the present invention.

FIG. 3 is a schematic flowchart of creating a policy group based on the system architecture of the composite NS shown in FIG. 2. The OSS in the figure undertakes a function of a policy decision entity. The NFVO-1 is located in a management domain of a composite NS, and undertakes a function of a policy execution entity in the management domain of the composite NS. Step S301: The OSS sends a policy group creation request message to the NFVO-1, where the request carries basic description information (Group Descriptor) of a to-be-created policy group, and identification information of each member policy forming the policy group. The identification information of the member policy includes an LCM policy identifier of one composite NS and LCM policy identifiers of one or more nested NSs forming the composite NS. It should be noted that identifiers of member policies need to be globally unique in the composite NS. In other words, the NFVO-1 can uniquely identify the policy. A numbering rule of the policy identifier is not within the scope of the technical solution of the present invention. Details are not described herein. The NFVO-1 receives the request message, allocates an identifier to the policy group, and records a correspondence between the identifier of the policy group and an identifier of a member policy in the policy group. In step S302, the NFVO-1 sends a policy group creation response message to the OSS, where the message carries information about a newly allocated identifier of the policy group. The OSS records the identifier, and subsequently instructs, by using the identifier of the policy group, the NFVO-1 to perform a cooperative operation on the member policy in the policy group. The foregoing NS cure policies in the management domains are used as an example. The created policy group is an NS cure policy group 1, and includes the following member policies: {a cure policy 1 of a composite NS, a cure policy 2 of a nested NS-A, and a cure policy 3 of a nested NS-B}.

It should be noted that, the policy group may be created by using the method shown in FIG. 3. The policy decision entity requests the NFVO-1 to create the policy group, or the policy group may be created by separately performing configuration on the policy decision entity and the NFVO-1. When the policy group is created in the configuration manner, it needs to be ensured that policy group configuration data of the policy decision entity is consistent with policy group configuration data of the NFVO-1, for example, consistency between the identifiers of the policy groups and consistency between the identifiers of the member policies in the policy groups.

After the policy group is created, the OSS may request the NFVO-1 to perform, on a per-policy group basis, a corresponding management operation on the member policy in the policy group based on a requirement.

Figure 4:
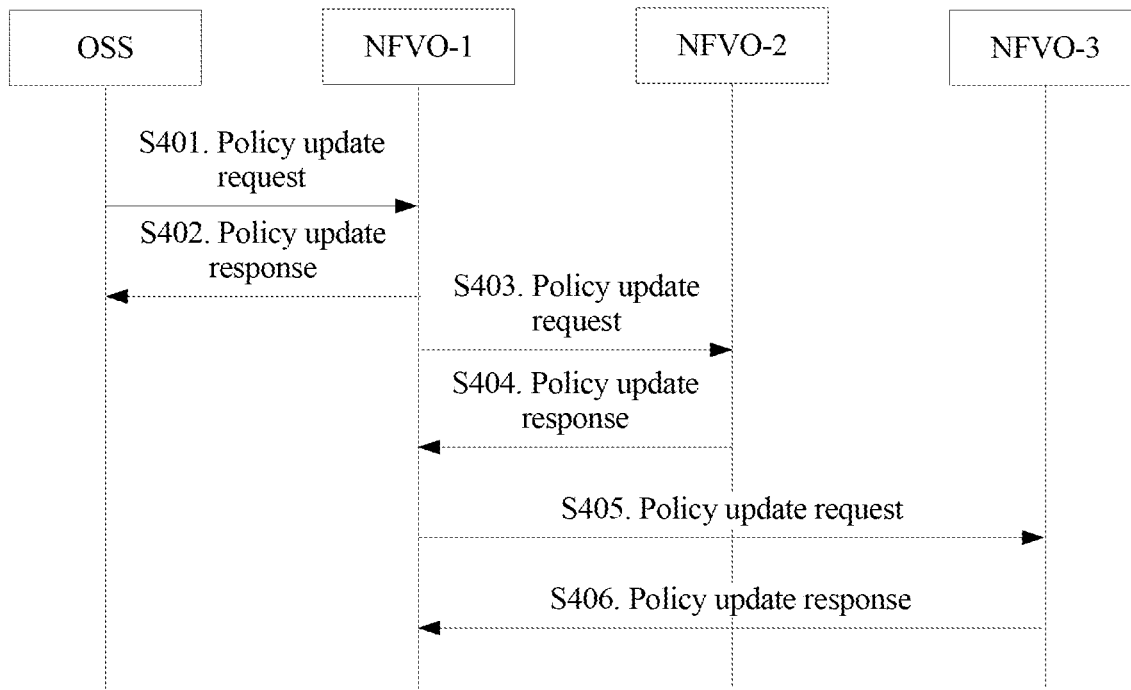
FIG. 4 is a schematic flowchart of updating a member policy in a policy group according to an embodiment of the present invention.

FIG. 4 is a schematic flowchart of performing, based on the system architecture of the composite NS shown in FIG. 2, cooperative policy update on the NS cure policy group 1 created in FIG. 3. In the figure, an OSS undertakes a function of a policy decision entity; when an NFVO-1 is located in a management domain of a composite NS; for the OSS, the NFVO-1 undertakes a function of a policy execution entity in the management domain of the composite NS; for an NFVO-2, the NFVO-1 implements a function of the OSS as a proxy and undertakes the function of the policy decision entity, to deliver a policy management operation request to the NFVO-2; when the NFVO-2 is located in a management domain of a nested NS-A, the NFVO-2 undertakes a function of a policy execution entity in the management domain of the nested NS-A; and when an NFVO-3 is located in a management domain of a nested NS-B, the NFVO-3 undertakes a function of a policy execution entity in the management domain of the nested NS-B. It may be learned from the foregoing descriptions of the cure policy 1 of the composite NS, the cure policy 2 of the nested NS-A, and the cure policy 3 of the nested NS-B that the NS cure policy in the management domain of the composite NS is different from the NS cure policy in the management domain of each associated nested NS. When a fault occurs on a network, decision conditions for performing NS cure are different in different management domains, or specific manners of performing cure are different, and as a result, a device status in the management domain of the composite NS may be different from that in the management domain of each nested NS. For example, some management domains have met a decision condition for an NS cure policy, and VNF instance migration has been started; but some management domains may not meet the decision condition for the NS cure policy. Consequently, that the composite NS provides a network service as a whole, or performs a life cycle maintenance operation of the network service as a whole may be probably affected. Therefore, it is necessary to update or modify all member policies in the policy group, to ensure consistency between the member policies.

Step S401: An OSS initiates a policy update request to an NFVO-1, where a request message includes an identifier of the cure policy 1 of the composite NS, an identifier of an NS cure policy group 1, and a policy update parameter. The policy update parameter includes a condition or an action for policy execution. For example, the condition for NS cure is "a virtual resource fault alarm of a severe fault level is received", and the action for NS cure is "a member VNF instance of the NS instance is migrated to another available standby virtual machine or an available container". It should be further noted that in this embodiment of the present invention, a policy management operation request message sent by the OSS to the NFVO-1 may not carry a policy identifier of the composite NS. In this case, because the NFVO-1 has recorded a correspondence between an identifier of a policy group and an identifier of a member policy in the policy group in a procedure of creating the policy group, the NFVO-1 may learn of the identifier of the member policy in the policy group by using the identifier of the policy group, and the identifier of the member policy includes the policy identifier of the composite NS.

Step S402: The NFVO-1 updates the cure policy 1 of the composite NS in the local management domain, and returns a policy update response to a policy manager, where the response message carries a result obtained after the cure policy 1 of the composite NS is updated.

Step S403: The NFVO-1 obtains an identifier of an LCM policy of the nested NS in the policy group based on an identifier of the NS cure policy group 1 received in step S401, namely, an identifier of the cure policy 2 of the nested NS-A and an identifier of the cure policy 3 of the nested NS-B; and then sends a policy update request message to the NFVO-2, where the policy update request message includes the identifier of the cure policy 2 of the nested NS-A and the policy update parameter, where the policy update parameter is consistent with the policy update parameter received by the NFVO-1 in step S401. It should be noted that the NFVO-1 may subscribe, to the NFVO-2 and the NFVO-3 by using an existing subscription notification mechanism, information about policy instances in the nested NS-A and the nested NS-B. In this way, NFVOs to which the cure policy 2 of the nested NS-A and the cure policy 3 of the nested NS-B belong may be learned of.

Step S404: The NFVO-2 updates the cure policy 2 of the nested NS-A based on the received policy update request message, and returns a policy update response message to the NFVO-1.

Step S405: Similar to step S403, the NFVO-1 initiates a policy update request message of the cure policy 3 of the nested NS-B to the NFVO-3, where the request message includes the identifier of the cure policy 3 of the nested NS-B and the policy update parameter. It should be noted that, in this embodiment of the present invention, cooperative policy management operations initiated by the NFVO-1 for management domains of a plurality of nested NSs forming the composite NS have no time sequence, namely, S403 and S405 have no time sequence. This processing principle is also applicable to messages in the following figure. Details are not described again.

Step S406: Similar to step S404, the NFVO-3 updates the cure policy 3 of the nested NS-B based on the received policy update request message, and returns a policy update response message to the NFVO-1.

Up to now, NS cure policies in the management domain of the composite NS and management domains of two nested NSs are updated. Member policies in the policy group are all updated, so that the LCM policy of the composite NS is consistent with the LCM policies of the nested NSs. An updated policy is as follows:

The cure policy 1 of the composite NS: When receiving a virtual resource fault alarm of a severe fault level, the NFVO-1 migrates a member VNF instance (which does not include a member nested NS instance) of the composite NS instance to another available standby virtual machine or an available container.

The cure policy 2 of the nested NS-A: When receiving a virtual resource fault alarm of a severe fault level, the NFVO-2 migrates a member VNF instance of the nested NS instance to another available standby virtual machine or an available container.

The cure policy 3 of the nested NS-B: When receiving a virtual resource fault alarm of a severe fault level, the NFVO-3 migrates a member VNF instance of the nested NS instance to another available standby virtual machine or an available container.

Compared with the solution in which the OSS separately initiates policy update to the NFVO-1, the NFVO-2, and the NFVO-3, in the solution of this embodiment, the policy execution entity NFVO-1 in the management domain of the composite NS shares a workload of the policy decision entity OSS. As a proxy of cooperative policy management, the NFVO-1 performs an operation on the policy in the local management domain, and in addition, triggers policy operation in the management domain of the nested NS. This improves policy management execution efficiency in a scenario of providing a composite NS across management domains, and ensures consistency between the LCM policy of the composite NS and the LCM policy of the nested NS in the policy group.

It should be noted that, after the policy update of a nested management domain in the policy group is completed, a notification message may be sent to the OSS, to notify the OSS of a policy update result of the nested management domain. The notification message may be sent by the NFVO-1 after step S406, or may be separately sent by the NFVO-2 and the NFVO-3 after the policy update of the nested management domain is completed. Certainly, the OSS may alternatively subscribe, to the NFVO in the management domain of the nested NS, status information of the policy by using an existing subscription notification mechanism. When the policy in the management domain of the nested NS is changed, the NFVO in the management domain of the nested NS sends a notification message to the OSS, to notify the OSS of a policy change status.

It should be further noted that, when the policy management operation request received by the NFVO in the management domain of the composite NS includes the identifier of the policy group, the identifier of the policy group may be used as an indication that the policy decision entity requires to perform a policy management operation on the member policy in the policy group, and directly initiates a policy management operation (for example, step S403 to step S406) on the LCM policy of the nested NS in the policy group. Alternatively, it may be determined, based on a local policy, whether to perform the policy management operation on the LCM policy of the nested NS in the policy group.

Figure 5:
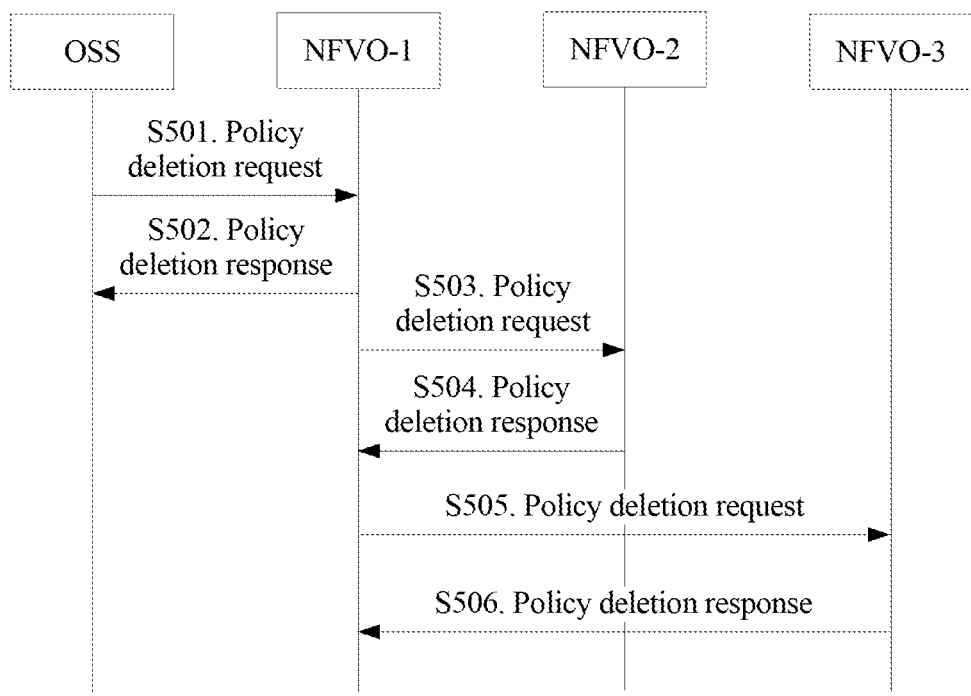
FIG. 5 is a schematic flowchart of deleting a policy group member according to an embodiment of the present invention.

FIG. 5 is a schematic flowchart of performing cooperative deletion on a member policy in the foregoing NS cure policy group 1 based on the system architecture of the composite NS shown in FIG. 2. A function of a functional entity in FIG. 5 is the same as a function of the functional entity in FIG. 4. Details are not described again.

In step S501, an OSS sends a policy deletion request message to an NFVO-1 in a management domain of a composite NS, where the policy deletion request message includes an identifier of the NS cure policy group 1, and optionally, may further include an identifier of a cure policy 1 of the composite NS. The NFVO-1 deletes the cure policy 1 of the composite NS in the local management domain based on the request message, and separately sends a policy deletion request to an NFVO-2 and an NFVO-3, to request to delete a cure policy 2 of a nested NS-A and a cure policy 3 of a nested NS-B in the policy group. An identifier of the cure policy 2 of the nested NS-A and an identifier of the cure policy 3 of the nested NS-B are respectively carried in the policy deletion request message in S503 and S505. There is no time sequence between the messages in S503 and S505.

Figure 6:
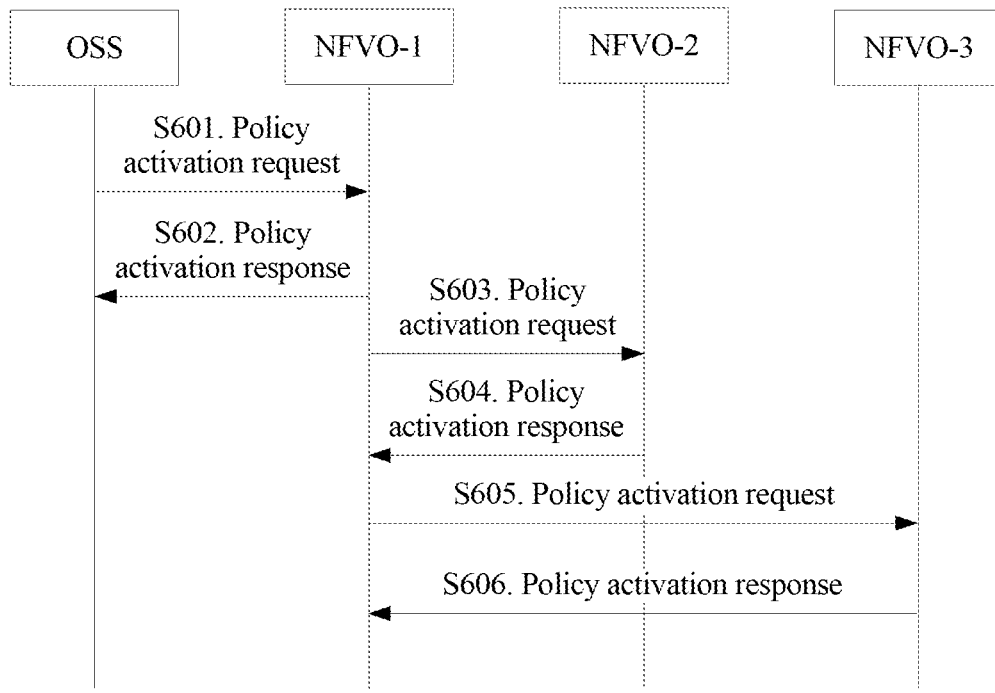
FIG. 6 is a schematic flowchart of activating a member policy in a policy group according to an embodiment of the present invention.

After a policy is created, the policy actually works provided that the policy is activated. FIG. 6 is a schematic flowchart of cooperatively activating a member policy in a policy group. An OSS cooperatively activates the member policy in the policy group by using an NFVO-1 without needing to separately send a policy activation request message to an NFVO-2 and an NFVO-3. FIG. 6 is a schematic flowchart of performing cooperative policy activation on an NS cure policy group 1 based on the system architecture of the composite NS shown in FIG. 2.

Step S601: The OSS initiates a policy activation request to the NFVO-1 in a management domain of a composite NS, to request to activate a cure policy 1 of the composite NS and a cure policy of a nested NS included in the NS cure policy group 1. The policy activation request command carries an identifier of the to-be-activated cure policy 1 of the composite NS and an identifier of the NS cure policy group 1.

Step S602: The NFVO-1 in the management domain of the composite NS returns a policy activation response to the OSS, where the response message carries a result of activating the cure policy 1 of the composite NS.

Step S603: The NFVO-1 in the management domain of the composite NS obtains, based on the received identifier of the NS cure policy group 1, an identifier of the cure policy of the nested NS that is in the policy group and that is associated with the cure policy 1 of the composite NS, and separately sends a policy activation command to the NFVO-2 and the NFVO-3 in step S603 and step S605, where the policy activation commands respectively carry an identifier of a cure policy 2 of a nested NS-A and an identifier of a cure policy 3 of a nested NS-B.

The NFVO-2 and the NFVO-3 in the management domains of the nested NSs return policy activation response messages to the NFVO-1 in the management domain of the composite NS in step S604 and step S606.

Figure 7:
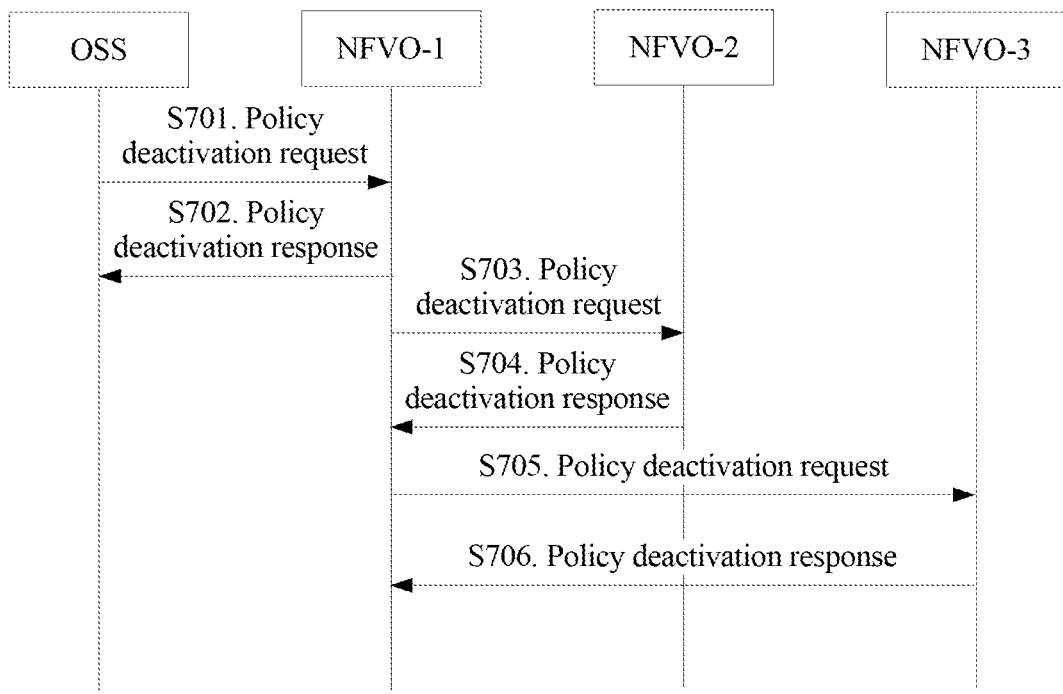
FIG. 7 is a schematic flowchart of deactivating a member policy in a policy group according to an embodiment of the present invention.

Likewise, the OSS may perform a cooperative policy deactivation operation on the policy group by using the NFVO-1. As shown in FIG. 7, a procedure of the cooperative policy deactivation operation is the same as that in FIG. 6. A difference is that a request and a response message in FIG. 7 are a deactivation request and a deactivation response message. A specific message procedure is not described again.

Figure 8:
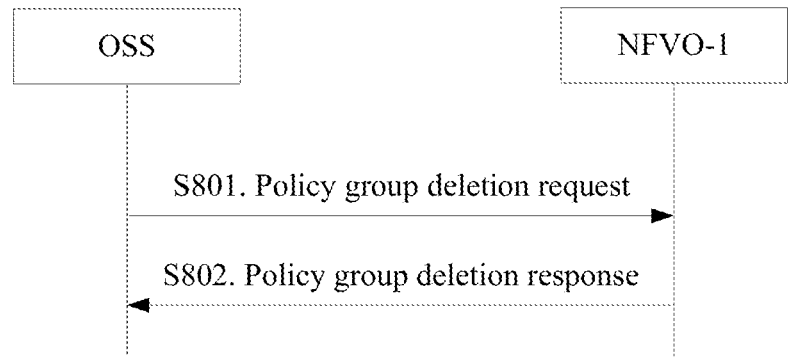
FIG. 8 is a schematic flowchart of deleting a policy group according to an embodiment of the present invention.

The policy decision entity may further send a policy group deletion request to the NFVO in the management domain of the composite NS to delete a created policy group, as shown in FIG. 8. In step S801, the policy decision entity requests the NFVO in the management domain of the composite NS to delete the policy group, where a request message carries an identifier of the policy group. The NFVO in the management domain of the composite NS deletes a record of the policy group that is locally recorded, and returns a policy group deletion response in step S802 to indicate a deleting result to the policy decision entity. This procedure may be performed when the policy decision entity does not need to maintain the policy group, for example, when a life cycle of the composite NS ends. Alternatively, when the policy decision entity needs to update a member policy in the policy group, the policy decision entity may first delete the policy group, and then create a policy group to update the member policy.

The foregoing mainly describes the solution provided in this embodiment of the present invention from a perspective of interaction between network elements. It may be understood that, to implement the foregoing functions, each function entity such as the OSS and the NFVO-1, includes a corresponding hardware structure and/or software module used to perform each function. A person of ordinary skill in the art should easily be aware that, in combination with the examples described in the embodiments disclosed in this specification, units, algorithms steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 9:
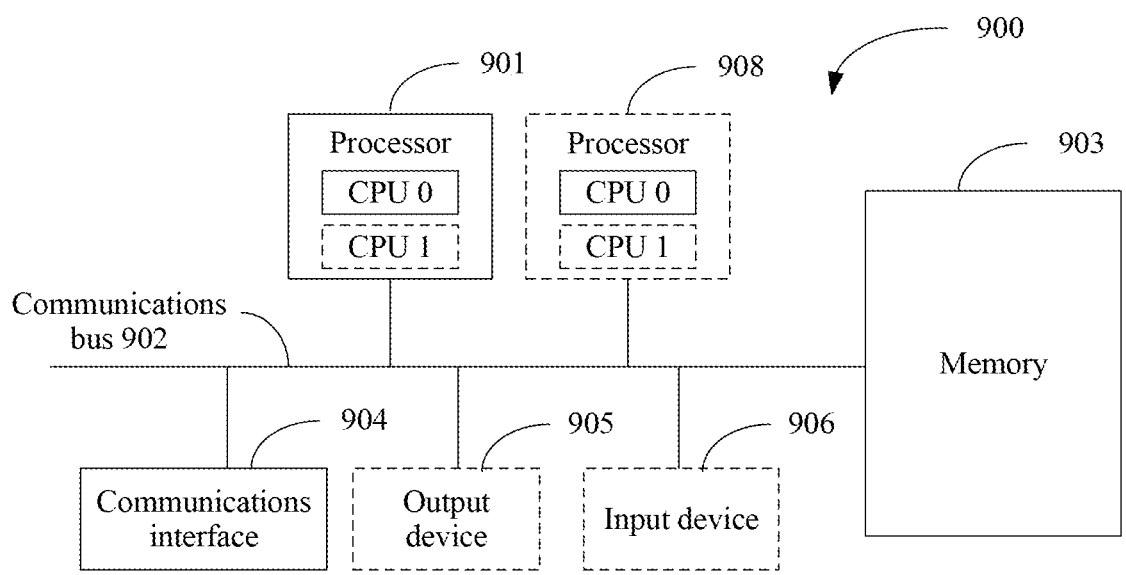
FIG. 9 is a schematic diagram of a computer device according to an embodiment of the present invention.

For example, the policy decision entity (for example, the OSS) or the NFVO-1 entity in this embodiment of the present invention may be implemented by using a computer device (or a system) in FIG. 9. FIG. 9 is a schematic diagram of a computer device according to an embodiment of the present invention. The computer device 900 includes at least one processor 901, a communications bus 902, a memory 903, and at least one communications interface 904.

The processor 901 may be a general-purpose central processing unit (central processing unit, CPU), a microprocessor, an application-specific integrated circuit (application-specific integrated circuit, ASIC), or one or more integrated circuits used to control program execution of the solutions in the present invention.

The communications bus 902 may include a path in which information is transmitted between the foregoing components.

The communications interface 904, by using any apparatus such as a transceiver, is configured to communicate with another device or communications network, such as an Ethernet, a radio access network (radio access network, RAN), or a wireless local area network (wireless local area network, WLAN).

The memory 903 may be a read-only memory (read-only memory, ROM) or another type of static storage device that can store static information and instructions, a random access memory (random access memory, RAM) or another type of dynamic storage device that can store information and instructions; and may also be an electrically erasable programmable read-only memory (electrically erasable programmable read-only memory, EEPROM), a compact disc read-only memory (compact disc read-only memory, CD-ROM), or other compact disc storage, optical disc storage (including a compact disc, a laser disc, an optical disc, a digital versatile disc, a blue-ray disc, or the like), and a disk storage medium or another disk storage device, or any other medium that can be used to carry or store expected program code that has an instruction or digital structure form and that can be accessed by a computer. This is not limited herein. The memory may exist independently and is connected to the processor by using the bus. The memory may alternatively be integrated with the processor.

The memory 903 is configured to store application program code for performing the solution of the present invention, and execution of the application program code is controlled by the processor 901. The processor 901 is configured to execute the application program code stored in the memory 903, to implement the function in the method in this patent.

In specific implementation, in an embodiment, the processor 901 may include one or more CPUs such as a CPU 0 and a CPU 1 in FIG. 9.

In specific implementation, in an embodiment, the computer device 900 may include a plurality of processors such as a processor 901 and a processor 908 in FIG. 9. Each of these processors may be a single-core (single-CPU) processor or a multi-core (multi-CPU) processor. The processor herein may be one or more devices, circuits and/or processing cores used to process data (for example, a computer program instruction).

In specific implementation, in an embodiment, the computer device 900 may further include an output device 905 and an input device 906. The output device 905 communicates with the processor 901 and may display information in various manners. For example, the output device 905 may be a liquid crystal display (liquid crystal display, LCD), a light emitting diode (light emitting diode, LED) display device, a cathode ray tube (cathode ray tube, CRT) display device, or a projector (projector). The input device 906 communicates with the processor 901 and may receive input of a user in various manners. For example, the input device 906 may be a mouse, a keyboard, a touch panel device, or a sensing device.

The computer device 900 may be a general-purpose computer device or a special-purpose computer device. In specific implementation, the computer device 900 may be a desktop computer, a portable computer, a network server, a personal digital assistant (personal digital assistant, PDA), a mobile phone, a tablet computer, a wireless terminal device, a communications device, an embedded device, or a device having a structure similar to that shown in FIG. 8. A type of the computer device 900 is not limited in this embodiment of the present invention.

In this embodiment of the present invention, function module division may be performed on the policy decision entity or the NFVO in the management domain of the composite NS based on the method example in the method embodiment, for example, each function module may be divided based on each function, or two or more functions may be integrated in one function module. It should be noted that, in this embodiment of the present invention, unit division is an example, and is merely a logical function division. In actual implementation, another division manner may be used.

Figure 10:
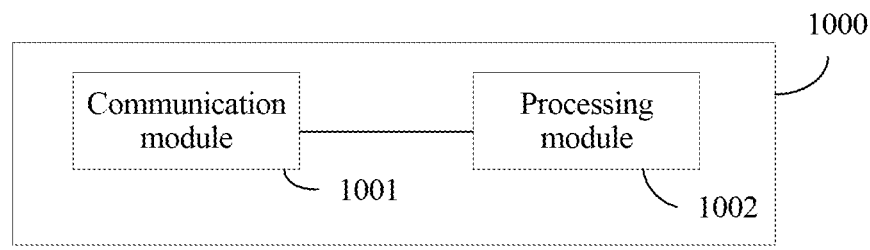
FIG. 10 is a schematic structural diagram of a policy decision entity according to an embodiment of the present invention.

For example, FIG. 10 is a possible schematic structural diagram of a policy decision entity in the foregoing embodiment, and the policy decision entity is configured to complete functions related to the policy decision entity in all the foregoing method embodiments. The device 1000 includes a communication module 1001 and a processing module 1002.

The communication module 1001 is configured to send a request message to an NFVO in a management domain of a composite NS or receive a response message from the NFVO in the management domain of the composite NS.

The processing module 1002 is configured to: generate a policy management operation request message, and send the policy management operation request message by using the communication module, where the policy management operation request message includes an identifier of a policy group.

In a possible implementation, the processing module 1002 is further configured to generate a policy group creation or deletion request message, where the policy group creation request message includes an identifier of a member policy in the policy group, the member policy includes an LCM policy of one composite NS and LCM policies of one or more nested NSs forming the composite NS, and the policy group deletion request message includes the identifier of the policy group; and is further configured to: parse a policy group creation response message that is received by the communication module from the NFVO in the management domain of the composite NS, and record the identifier of the policy group included in the policy group creation response message.

Figure 11:
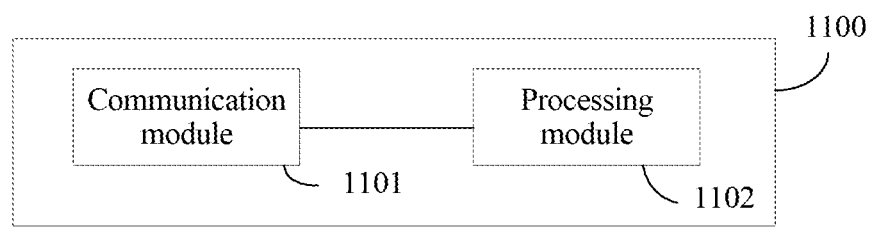
FIG. 11 is a schematic structural diagram of an NFVO in a management domain of a composite NS according to an embodiment of the present invention.

FIG. 11 is a possible schematic structural diagram of an NFVO in a management domain of a composite NS in the foregoing embodiment, and the NFVO is configured to complete functions related to the NFVO in the management domain of the composite NS in all the foregoing method embodiments. The device 1100 includes a communication module 1101 and a processing module 1102.

The communication module 1101 is configured to receive a policy group creation or deletion request message from a policy decision entity, is further configured to send a policy group creation or deletion response message to the policy decision entity, and is further configured to receive a policy management operation request message sent by the policy decision entity.

The processing module 1102 is configured to: parse the received policy management operation request message, determine, based on an identifier that is of a policy group and that is included in the policy management operation request message, an identifier of an LCM policy that is of a nested NS and that is included in the policy group, and generate a policy management operation request sent to an NFVO in a management domain of the nested NS, where the request message includes the identifier of the LCM policy of the nested NS.

In a possible implementation, the communication module 1101 of the NFVO in the management domain of the composite NS is further configured to receive the policy group creation or deletion request message from the policy decision entity, and is further configured to send the policy group creation or deletion response message to the policy decision entity. The processing module 1102 of the NFVO in the management domain of the composite NS is further configured to: parse the received policy group creation request message, create the policy group locally, and allocate the identifier to the policy group, where the policy group creation request message includes an identifier of a member policy in the policy group, and the member policy includes an LCM policy of one composite NS and LCM policies of one or more nested NSs forming the composite NS; and generate the response message for the policy group creation request, and send the response message to the policy decision entity by using the communication module, where the response message for the policy group creation request includes the identifier of the policy group. The processing module 1102 is further configured to parse the policy group deletion request message received by the communication module, and delete a corresponding policy group according to an identifier of the policy group in the request message.

The foregoing function module may be implemented in a form of hardware, or may be implemented in a form of a software function module. In a simple embodiment, a person skilled in the art may figure out that the policy decision entity 1000 or the NFVO 1100 in the management domain of the composite NS may be in a form shown in FIG. 9. For example, the processing module 1002 in FIG. 10 may be implemented by invoking code in the memory 903 by the processor 901 in FIG. 9. This is not limited in this embodiment of the present invention.

The objectives, technical solutions, and beneficial effects of the present invention are further described in detail in the foregoing specific embodiments. A person skilled in the art should understand that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

What is claimed is:

1. A method for policy management applied to a scenario of providing a composite network service (NS) across management domains, the composite NS comprising one or more nested NSs, the composite NS and the nested NS being provided in different management domains, wherein a network function virtualization orchestrator (NFVO) in a management domain of the composite NS is responsible for a life cycle management (LCM) of the composite NS, and a NFVO in a management domain of the nested NS is responsible for a LCM of the nested NS, the method comprising:
    receiving, by the NFVO in the management domain of the composite NS, a first policy management operation request, wherein the first policy management operation request comprises an identifier of a policy group;
    determining, by the NFVO in the management domain of the composite NS, based on the identifier of the policy group, an identifier of a LCM policy that is of the nested NS and that is comprised in the policy group; and
    sending, by the NFVO in the management domain of the composite NS, a second policy management operation request to the NFVO in the management domain of the nested NS, wherein the second policy management operation request comprises the identifier of the LCM policy of the nested NS.

2. The method according to claim 1, wherein before receiving, by the NFVO in the management domain of the composite NS, a first policy management operation request, the method further comprises:
    receiving, by the NFVO in the management domain of the composite NS, a policy group creation request for creating a policy group, wherein the policy group creation request comprises an identifier of a member policy of the policy group, and the member policy comprises the LCM policy of the nested NS;
    creating, by the NFVO in the management domain of the composite NS, the policy group based on the policy group creation request, and allocating an identifier to the policy group; and
    sending, by the NFVO in the management domain of the composite NS, a response corresponding to the policy group creation request, wherein the response message comprises the identifier of the policy group.

3. The method according to claim 2, further comprising:
    receiving, by the NFVO in the management domain of the composite NS, a policy group deletion request, wherein the policy group deletion request comprises an identifier of a to-be-deleted policy group.

4. The method according to claim 1, wherein a type of policy management operation requested in the second policy management operation request is the same as a type of policy management operation requested in the first policy management operation request, and comprises any one of the following policy management operations: policy update, policy deletion, policy activation, or policy deactivation.

5. The method according to claim 4, wherein, when the first policy management operation request is used as a policy update request, the first policy management operation request further comprises a policy update parameter, and the policy update parameter is applied to the policy in the policy group.

6. A method for policy management applied to a scenario of providing a composite network service (NS) across management domains, the composite NS comprising one or more nested NSs, the composite NS and the nested NS being provided in different management domains, wherein a network function virtualization orchestrator (NFVO) in a management domain of the composite NS is responsible for a life cycle management (LCM) of the composite NS, the method comprising:
    generating, by a policy decision entity, a first policy management operation request, wherein the first policy management operation request comprises an identifier of a policy group, wherein the policy group comprises one ore more member policies, wherein a member policy is an LCM policy of one composite NS or a LCM policy of one or more nested NSs forming the composite NS; and
    sending, by the policy decision entity, the first policy management operation request to the NFVO in the management domain of the composite NS.

7. The method according to claim 6, wherein the method further comprises:
    generating, by the policy decision entity, a policy group creation request, wherein the policy group creation request comprises an identifier of the member policy of the policy group;
    sending, by the policy decision entity, the policy group creation request to the NFVO in the management domain of the composite NS; and
    receiving, by the policy decision entity, a response message that is for the policy group creation request, wherein the response message comprises the identifier of the policy group allocated by the NFVO in the management domain of the composite NS.

8. The method according to claim 7, wherein the method further comprises:
    sending, by the policy decision entity, a policy group deletion request message to the NFVO in the management domain of the composite NS, to request the NFVO in the management domain of the composite NS to delete a created policy group, wherein the policy group deletion request message comprises an identifier of a to-be-deleted policy group.

9. The method according to claim 6, wherein the first policy management operation request comprises any one of the following policy management operations: policy update, policy deletion, policy activation, or policy deactivation.

10. A policy decision entity for policy management applied to a scenario of providing a composite network service (NS) across management domains, the composite NS comprising one or more nested NSs, the composite NS and the nested NS being provided in different management domains, wherein a network function virtualization orchestrator (NFVO) in a management domain of the composite NS is responsible for a life cycle management (LCM) of the composite NS, the policy decision entity comprising a system including:
  a communications interface;
  a processor; and
  a memory, the memory comprising a non-transitory computer-readable memory, wherein the memory is configured to store a computer executable instruction, an identifier of a policy group, and an identifier of a member policy comprised in the policy group, and, wherein the processor is connected to the memory and the communications interface by a bus, and the processor is configured to execute the computer executable instruction in the memory to:
  generate a first policy management operation request and send the first policy management operation request to the NFVO in the management domain of the composite NS through the communications interface, wherein the first policy management operation request comprises the identifier of the policy group.

11. The policy decision entity according to claim 10, wherein the identifier that is of the policy group and that is stored in the memory is allocated by the NFVO in the management domain of the composite NS based on a policy group creation request sent by the policy decision entity, and is returned to the policy decision entity by using a response message, is implemented as follows:
  the communications interface is further configured to send to the NFVO in the management domain of the composite NS, a policy group creation request message generated by the processor, and receive a response message that is for the policy group creation request and that is sent by the NFVO in the management domain of the composite NS; and
  the processor is further configured to execute the computer executable instruction in the memory to implement the following functions:
  generating the policy group creation request message, and sending the policy group creation request message to the NFVO in the management domain of the composite NS through the communications interface, wherein the policy group creation request message comprises the identifier of the member policy in the policy group, and the member policy is a LCM policy of one composite NS or a LCM policy of one or more nested NSs forming the composite NS; and
  parsing the response message that is for the policy group creation request and that is received by the communications interface and sent by the NFVO in the management domain of the composite NS, parsing and obtaining the identifier allocated by the NFVO in the management domain of the composite NS to the policy group, and transmitting, by using the bus, the identifier of the policy group to the memory for storage.

12. The policy decision entity according to claim 11, wherein the processor is further configured to: generate a policy group deletion request message, and send the policy group deletion request message to the NFVO in the management domain of the composite NS through the communications interface to request the NFVO in the management domain of the composite NS to delete a created policy group, wherein the policy group deletion request message comprises an identifier of a to-be-deleted policy group.

13. The policy decision entity according to claim 10, wherein the first policy management operation request that is generated by the processor and that is sent to the NFVO in the management domain of the composite NS through the communications interface comprises any one of the following policy management operations: policy update, policy deletion, policy activation, or policy deactivation.

14. A network function virtualization orchestrator (NFVO) entity in a management domain of a composite network service (NS) applied to a scenario of providing the composite NS across management domains, wherein the composite NS comprises one or more nested NSs, the composite NS and the nested NS being provided in different management domains, an NFVO in a management domain of the composite NS being responsible for a life cycle management (LCM) of the composite NS, an NFVO in a management domain of the nested NS being responsible for the life cycle management (LCM) of the nested NS, wherein the NFVO entity in the management domain of the composite NS comprises:
  a communications interface;
  a processor; and
  a memory, the memory comprising a non-transitory computer-readable memory, wherein the memory is configured to store a computer executable instruction, an identifier of a policy group, and an identifier of a member policy comprised in the policy group, and, wherein the processor connected to the memory and the communications interface by a bus is configured to execute the computer executable instruction in the memory to perform the following functions:
  parse a first policy management operation request;
  determine, based on the identifier of the policy group comprised in the first policy management operation request, an identifier of an LCM policy that is of the nested NS and comprised in the policy group;
  generate a second policy management operation request; and
  send the second policy management operation request to the NFVO in the management domain of the nested NS through the communications interface, wherein the second policy management operation request comprises the identifier of the LCM policy of the nested NS.

15. The NFVO entity in a management domain of a composite NS according to claim 14, wherein the policy group is created by the NFVO in the management domain of the composite NS based on a request of a policy decision entity;
  the communications interface is further configured to receive a policy group creation request message sent by the policy decision entity, and return a response message for the policy group creation request message to the policy decision entity; and
  the processor is further configured to execute the computer executable instruction in the memory to implement the following functions:
  parsing the received policy group creation request message, creating the policy group, and allocating an identifier to the policy group, wherein the policy group creation request message comprises the identifier of the member policy in the policy group, and the member policy is a LCM policy of one composite NS or a LCM policy of one or more nested NSs forming the composite NS; and generating the response message for the policy group creation request message, and sending the response message to the policy decision entity through the communications interface, wherein the response message for the policy group creation request message comprises the identifier of the policy group.

16. The NFVO entity in a management domain of a composite NS according to claim 15, wherein the communications interface is further configured to receive a policy group deletion request message sent by the policy decision entity, the policy group deletion request message comprises an identifier of a to-be-deleted policy group, and the processor deletes the corresponding policy group according to the identifier of the policy group.

17. The NFVO entity in a management domain of a composite NS according to claim 14, wherein a type of policy management operation requested in the second policy management operation request is the same as a type of policy management operation requested in the first policy management operation request, and comprises any one of the following policy management operations: policy update, policy deletion, policy activation, or policy deactivation.

18. A policy management system comprising a communications interface, a processor, and a memory, the memory comprising a non-transitory computer-readable memory, said policy management system configured to provide:
 a policy decision entity; and
 a network function virtualization orchestrator (NFVO) entity, the NFVO entity being in a management domain of a composite network service (NS), wherein the policy management system is applied to a scenario of providing the composite NS across management domains, the composite NS comprising one or more nested NSs, the composite NS and the nested NS being provided in different management domains;
 wherein, the policy decision entity is configured to send a first policy management operation request to an NFVO in the management domain of the composite NS, wherein the first policy management operation request comprises an identifier of a policy group; and
 wherein, the NFVO in the management domain of the composite NS, is configured to receive the first policy management operation request, determine, based on the identifier of the policy group, an identifier of a life cycle management (LCM) policy of the nested NS and included in the policy group, and to send a second policy management operation request to a NFVO in a management domain of the nested NS, wherein the second policy management operation request comprises the identifier of the LCM policy of the nested NS, wherein the NFVO in the management domain of the nested NS is responsible for the LCM of the nested NS.

19. A computer readable storage medium, comprising an instruction, wherein when the instruction runs on a computer, the computer performs the method related to the policy decision entity according to claim 1.

20. A computer readable storage medium, comprising an instruction, wherein when the instruction runs on a computer, the computer performs the method related to the NFVO entity in a management domain of a composite NS according to claim 1.

* * * * *